United States Patent [19]

Wargo

[11] 4,402,013
[45] Aug. 30, 1983

[54] VIDEO SIGNAL ANALYZER
[75] Inventor: Robert A. Wargo, Ringoes, N.J.
[73] Assignee: RCA Corporation, New York, N.Y.
[21] Appl. No.: 328,436
[22] Filed: Dec. 7, 1981
[30] Foreign Application Priority Data Apr. 6, 1981 [GB] United Kingdom ............... 8110693

[51] Int. Cl.³ ............................................. H04N 5/14
[52] U.S. Cl. ................................. 358/160; 358/166; 358/280; 358/282
[58] Field of Search ............... 358/21 R, 36, 37, 96, 358/160, 166, 167, 280, 282, 284, 905

[56] References Cited

U.S. PATENT DOCUMENTS

| 3,984,865 | 10/1976 | Avins | 358/36 |
| 4,130,835 | 12/1978 | Guildford | 358/160 |
| 4,303,895 | 12/1981 | Ohnishi et al. | 333/18 |
| 4,316,100 | 2/1982 | Sakaue et al. | 377/62 |

Primary Examiner—Richard Murray

Attorney, Agent, or Firm—E. M. Whitacre; P. J. Rasmussen; P. M. Emanuel

[57] ABSTRACT

Apparatus is provided which is responsive to a video signal for producing a position-modulated pulse train which is representative of the occurrence of transitions of the video signal. A transversal filter is responsive to the video signal and produces a differentiated replica of the video signal over a given band of frequencies. The output of the transversal filter contains transitional information of the video signal occupying a range of frequencies which is to be analyzed. Information representing transitions of positive, negative, or both polarities is then compared to a given threshold value. Signal transitions exceeding the threshold are converted to pulses, thereby producing a train of pulses representing significant transitions of a desired polarity or polarities. The times of occurrence of the pulses are then analyzed to generate a control signal for controlling a given characteristic of the video signal during processing.

17 Claims, 18 Drawing Figures

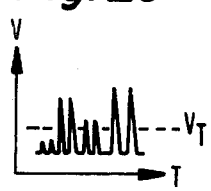
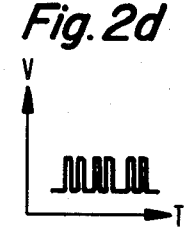
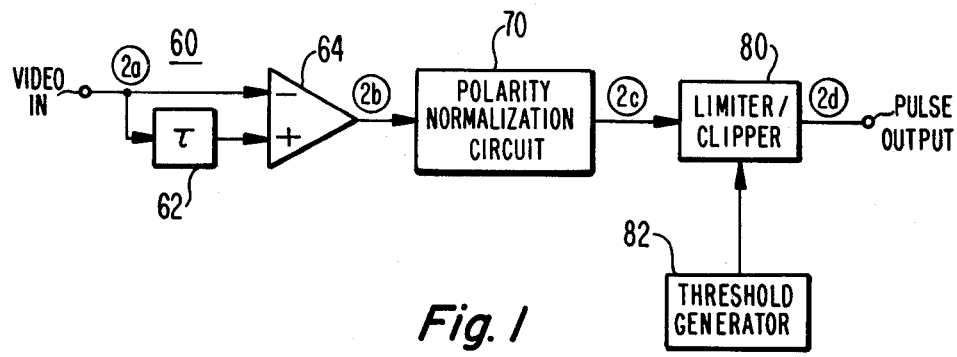
Fig. 1
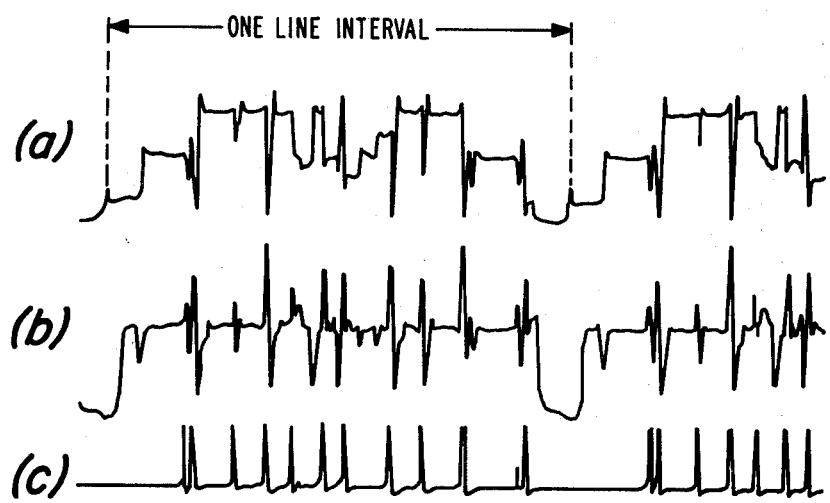
Fig. 3

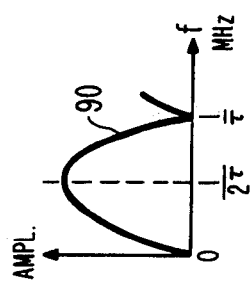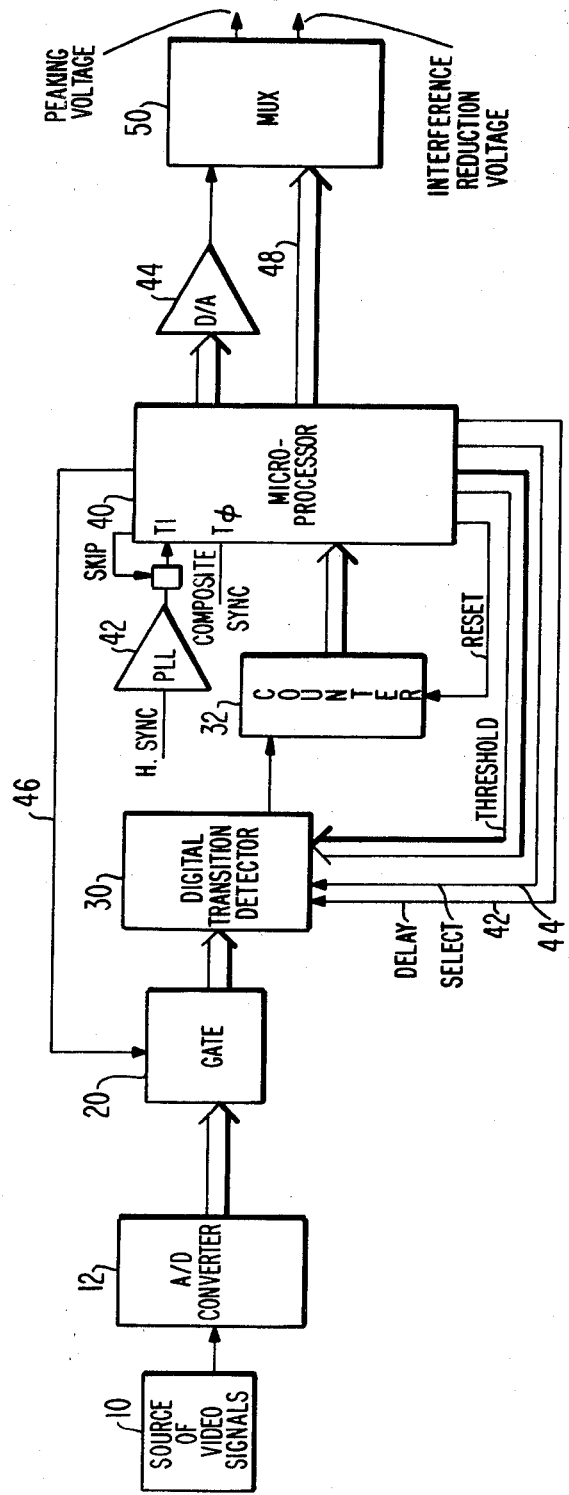

VIDEO SIGNAL ANALYZER

This invention relates to video signal analyzing systems and, in particular, to analog and digital systems for analyzing the signal content of a video signal on the basis of signal transitions.

When processing a video signal, it is frequently desirable to have a knowledge of the signal content so as to be able to adaptively process the signal. One characteristic which provides useful information is the transition characteristic of the video signal. Both the rate, or high frequency content, of the transitions, and the number of transitions within a given video signal interval, provide information which can be used for adaptively processing the signal. For instance, the random occurrence of transitions of many different frequencies can provide an indication of a high noise content in the video signal, which can trigger processing circuitry to reduce or eliminate noise pulses. The repetitive occurrence of transitions of a particular frequency may indicate the presence of interfacing beats generated by a strong adjacent channel signal in a television receiver, and its detection may be used to activate circuitry to attenuate adjacent channel signals. The occurrence of many transitions in a video field, with the numbers of transitions in a number of fields being contained within a narrow range of values, may indicate a signal with highly detailed scene content, and may activate signal enhancement, or peaking, circuitry. A low number of transitions in a field may activate the peaking circuitry in a complementing sense. Thus, various responses are possible when information is available as to the number of type of transitions in a video signal.

In accordance with the principles of the present invention, apparatus is provided which is responsive to a video signal for producing a position-modulated pulse train which is representative of the occurrence of transitions of the video signal. Specifically, a transversal filter is responsive to the video signal and produces a differentiated replica of the video signal over a given band or bands of frequencies which are to be analyzed. The output of the transversal filter thus contains transitional information of the video signal occupying the band or bands of frequencies which are to be analyzed. Signals representing transitions of positive, negative, or both polarities are then compared to a given threshold value. Signal transitions exceeding the threshold are converted to pulses, thereby producing a train of pulses representing significant transitions of a desired polarity or polarities. The pulse train may then be analyzed to make a determination of how the video signal is to be processed in accordance with the character of its transitions.

In a preferred embodiment of the present invention, the transfer characteristic of the transversal filter may be adaptively selected. Transitions of positive, negative, or both polarities may be represented by the pulse train. Also, the threshold value against which the transitions are compared may be varied to control the nature and number of transitions represented by the pulse train.

In the drawings:

FIG. 1 illustrates, in block diagram form, an analog video signal transition detector constructed in accordance with the principles of the present invention;

FIGS. 2a-d and 3a-c illustrate waveforms depicting the operation of the arrangement of FIG. 1;

FIG. 5 illustrates a typical transfer characteristic of the digital transversal filter of the arrangement of FIG. 4;

FIG. 6 illustrates, in block diagram form, apparatus for producing adaptive signal processing control signals, constructed in accordance with the principles of the present invention;

Figure 7:
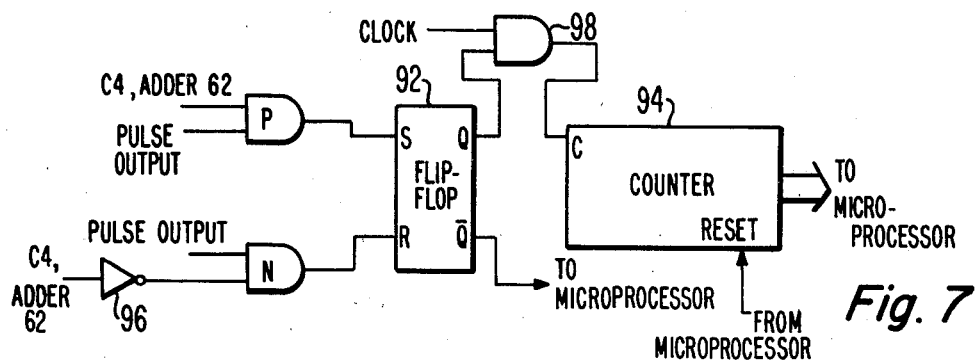
FIG. 7 illustrates, in block diagram form, an arrangement suitable for use in the arrangement of FIG. 6 for determining the period of a video signal.
Figure 9:
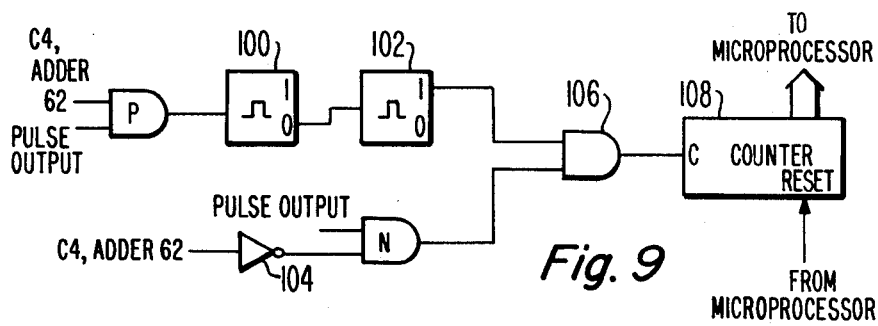

FIGS. 8a-c illustrate waveforms useful for explaining the operation of the arrangement of FIG. 7;

FIG. 9 illustrates, in block diagram form, an arrangement suitable for use in combination with the arrangement of FIG. 6 for determining the presence of signal content of a given band of frequencies in a video signal; and FIGS. 10a and b illustrate waveforms useful for explaining the operation of the arrangement of FIG. 9.

An analog video signal transition detector, constructed in accordance with the principles of the present invention, is shown in block diagram form in FIG. 1. A baseband video signal, such as that shown in FIG. 2a, is applied to the input of a transversal filter 60, including a delay element 62 and a comparator 64. The delay element 62 may typically provide a delay of approximately 250 nanoseconds to the input signal at one input of comparator 64, giving the transversal filter a response characteristic peaked around 2 MHz. The transversal filter will then act in the manner of a differentiator to pass high frequency transition information, illustratively shown in FIG. 2b. If it is desired to utilize both transition polarities, a polarity normalization circuit 70 is used to convert the transition information to a common polarity, as shown in FIG. 2c. The transition information is then applied to a limiter/clipper 80, which converts the transition information into a sequence of pulses, as shown in FIG. 2d. A threshold generator 82 is used to select transitions above a given magnitude, thereby controlling the sensitivity of the detector, as shown by threshold level $V_T$ in FIG. 2c. The pulse sequence produced at the output of the transition detector of FIG. 1 is seen to comprise pulses representative of the times of occurrence of transitions of the input video signal.

The transition detector of FIG. 1 may be used to continuously process the transition information of the horizontal lines of a video signal. A typical line interval of a video signal, reproduced from an oscillograph, is shown in FIG. 3(a). The signal of FIG. 3(a) is seen to comprise numerous transitions from varying levels of light and dark representative signals. When this signal is processed by the transversal filter 60 of FIG. 1, the positive and negative transitions are referenced to a relatively stable D.C. level, as shown in FIG. 3(b). When the polarity normalization circuit 70 is controlled to pass only positive transition information, for instance, the positive transitions are applied to the limiter/clipper 80 to produce the pulse train shown in FIG. 3(c), which is representative of the times of occurrence of positive transitions of the video signal of FIG. 3(a).

Figure 4:
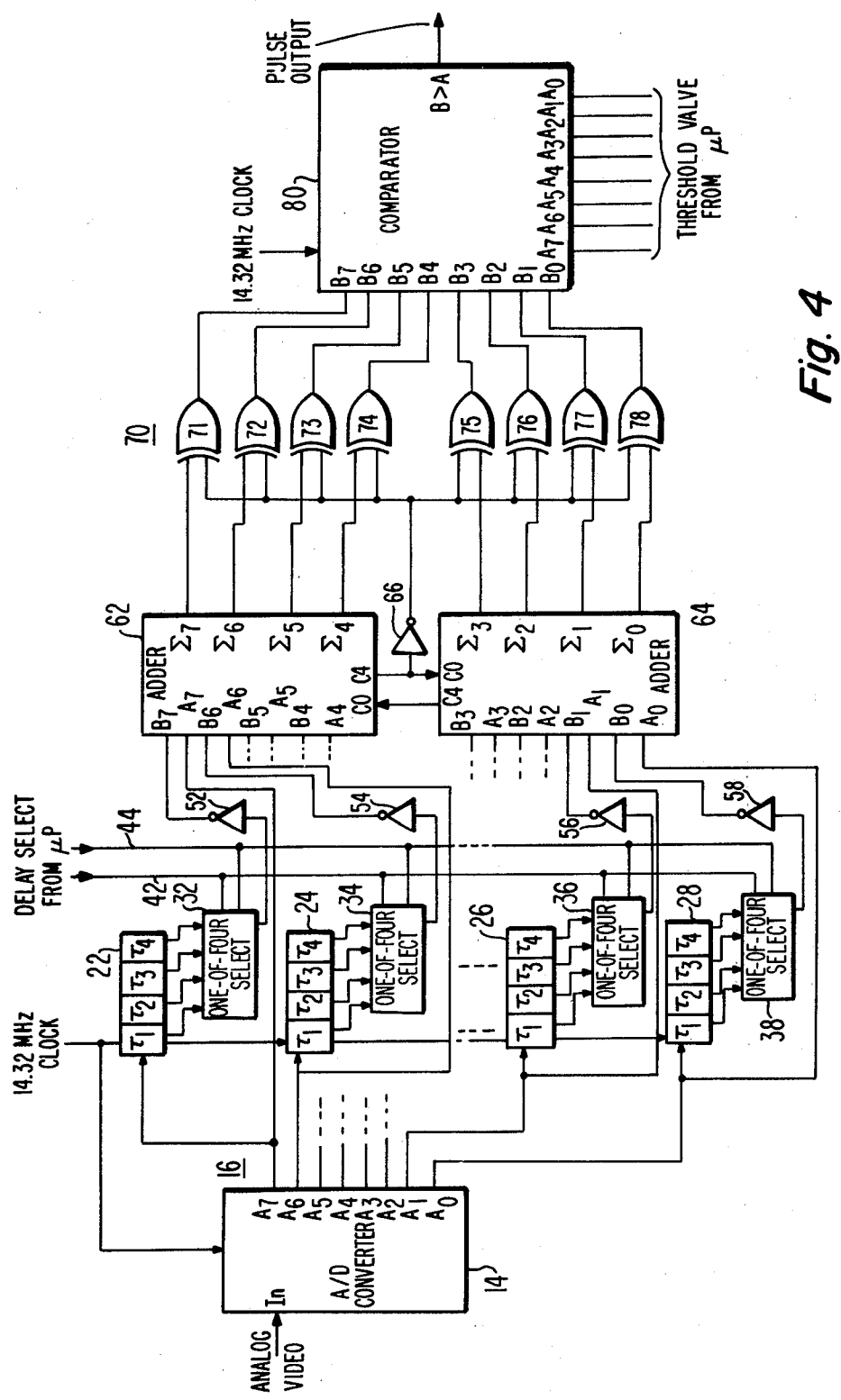
FIG. 4 illustrates, in block diagram form, a digital video signal transition detector constructed in accordance with the principles of the present invention.

A digital video signal transition detector, constructed in accordance with the principles of the present invention, is illustratively shown in FIG. 4. A baseband video signal, such as that shown in FIG. 3(a), is applied to the input of an analog-to-digital converter 14. The analog-to-digital converter 14 continuously samples the video signal in response to a clock signal at a rate which satisfies the Nyquist criterion of the signal to be processed. In this example, the clock signal of 14.32 MHz is four times the frequency of the NTSC color subcarrier. Digital samples, in the form of eight bit words ($A_7 \ldots A_0$) are produced at the output of the analog-to-digital converter 14.

The eight output lines of the analog-to-digital converter 14 are applied to the eight "A" inputs of two adders 62 and 64, and to eight delay line shift registers, four of which are shown in FIG. 4 (shift registers 22, 24, 26 and 28). The digital signal information is clocked through the shift registers by the 14.32 MHz clock, and appears at four outputs of each register. The shift registers thus produce digital signal information delayed by one, two, three, and four clock cycles at their outputs. One output of each shift register is chosen by one-of-four select switches 32, 34, 36 and 38 and is coupled to a respective "B" input of adders 62 and 64 by way of inverters 52, 54, 56 and 58. The one-of-four select switches 32, 34, 36 and 38 are controlled by signals supplied by control lines 42 and 44 from an external source of control signals, such as a microprocessor (to be described in FIG. 6). The carry-out output C4 of adder 64 is coupled to the carry-in input C0 of adder 62, and the carry-out output C4 of adder 62 is coupled to the carry-in input C0 of adder 64. The adders 62 and 64 produce an eight-bit sum signal of delayed and undelayed signals at their outputs $\Sigma_7 \ldots \Sigma_0$.

The outputs of adders 62 and 64 are coupled to respective inputs of exclusive-OR gates 71–78 of an array 70 of exclusive-OR gates. A second input of each exclusive-OR gate receives an inverted carry-out signal from adder 62 by way of an inverter 66. The outputs of the exclusive-OR gates 71–78 are coupled to the "B" inputs of a digital comparator 80. A digital threshold value is applied to the "A" inputs of the comparator 80 from an external signal source, such as the microprocessor. The comparator 80 produces a pulse at its B>A output when it is clocked by the 14.32 MHz clock and the value of the signal information word at its "B" inputs exceeds the threshold value at its "A" inputs.

The shift registers 22–28, the one-of-four select switches 32–38, the inverters 52–58, and the adders 62 and 64 together comprise an adaptive transversal filter for the digital video signal information provided by the analog-to-digital converter 14. The transversal filter exhibits a response characteristic as shown in FIG. 5 by curve 90, where $\tau$ is the cumulative delay provided by the shift registers, select switches, and inverters 52–58. The frequencies of maximum and minimum signal attenuation $1/\tau$ and $\frac{1}{2}\tau$, respectively, are determined by the delay select signals on lines 42 and 44. For example, when the signals on lines 42 and 44 cause the one-of-four select switches 32–38 to couple the outputs of shift register stages $\tau_4$ to the adders, the maximum signal attenuation frequency will be 1/279 nsec, or 3.58 MHz, which is the color subcarrier frequency in the NTSC system. The transversal filter will thereby attenuate the chrominance information of an NTSC television signal, and will pass the relatively higher frequency luminance information of the NTSC signal, located about the color subcarrier.

When the signals on lines 40 and 42 change, different shift register outputs are selected, giving the transversal filter different attenuation characteristics. For example, if shift register stages $\tau_3$ are selected, the filter characteristic will provide maximum attenuation at about 4.77 MHz, and will peak around 2.38 MHz. This characteristic would be helpful in analyzing high frequency noise characteristics of the NTSC signal, for instance. If the outputs of shift register stages $\tau_2$ are selected, the filter characteristic will peak at 3.58 MHz, and will pass chrominance transition information in the NTSC signal for analysis.

In the digital notation used in the embodiment of FIG. 4, a logical "1" carry-out signal from adder 62 is taken to indicate a "positive" sum, and a logical "0" is taken to denote a "negative" sum. The inverters 52–58 of the transversal filter one's complement the delayed signal information at the inputs of the adders. The carry-out signal C4 of the higher order bit adder 62 is a logical "1" for positive signal values and, by virtue of the look-ahead capability of the adders, this logical "1" value is carried into lower order bit adder 64 to provide a two's complementing of the signal information at the "B" inputs of the adders. This two's complementing accomplishes subtraction of the delayed signal information from the undelayed information at the outputs of the adders for positive sum values.

When the output signal of the adders has a positive value, the logical "1" carry-out of adder 62 is inverted by inverter 66 and applied to the exclusive-OR gates 71–78. The exclusive-OR gates will then pass positive signal values to comparator 80 without modification. If, however, the output signal of the adders is negative, the output of C4 of adders 62 is a logical zero, which provides a carry-in C0 of zero to adder 64 and is applied to the exclusive-OR gates in inverted form as a logical "1". The exclusive-OR gates will then invert, or one's complement the signal values between the adders and the comparator, which effectively normalizes the adder output signals to all "positive" values of the chosen digital notation.

The comparator 80 compares the signal values with a threshold value and produces a pulse of substantially constant duration when the signal transitions exceed the threshold provided by the external signal source. The comparator pulses exhibit uniform pulse widths due to the clocking of the comparator. The threshold value can be adjusted to change the sensitivity of the transition detector in accordance with a type of analysis being performed. For instance, if little transition information is being detected at a given threshold value, the threshold value can be lowered, causing more pulses to be produced by the comparator 80 for a given input signal. Smaller transitions may thereby be detected.

FIG. 6 illustrates an arrangement using a transition detector of the present invention to develop a peaking control signal for the luminance channel and an interference reduction control signal for the tuner or I.F. circuitry of a television receiver. A source of video signals 10, which may comprise, for instance, the video signal detector in a television receiver, supplies baseband video signals to the input of an analog-to-digital converter 12. The analog-to-digital converter 12 applies digitized video signal samples to the input of a gate 20. The gate 20 passes the digitized signal samples to the input of a digital transition detector, constructed as shown in FIG. 4, when enabled by a signal on control line 46. The gate 20 may comprise, for instance, a parallel array of gates or a flip-flop register.

The digital transition detector 30 produces a train of position-modulated transition representative pulses which are applied to a counter 32. The accumulated count of the counter 32 is applied to an input of a microprocessor 40. The microprocessor 40 is arranged to execute instructions and perform operations in phase and frequency synchronism with the video signal through receipt of the composite video synchronizing signal at an input T0, and a clock signal from a phase-locked loop circuit 42, which is locked to the video horizontal synchronizing signal, through a technique of clock cycle skipping, at an input T1. Further details of operating a microprocessor in this way are found in my U.S. patent application Ser. No. 280,475 entitled METHOD AND APPARATUS FOR OPERATING A MICROPROCESSOR IN SYNCHRONISM WITH A VIDEO SIGNAL, filed July 6, 1981. The microprocessor 40 supplies output signals by way of a digital-to-analog converter 44 to a multiplexer 50. The multiplexer 50 is controlled by microprocessor signals on lines 48 to provide analog peaking and interference reduction voltages at its two outputs. The microprocessor 40 also supplies an enabling signal for the gate 20 on conductor 46, delay select signals on lines 42 and 44, a digital threshold value for the transition detector 30, and a reset signal for the counter 32.

In operation, the microprocessor 40 closes the gate 20 so that the video signal may be sampled for some portion of a video field. For instance, the gate 20 can be controlled to apply the lines of the active video (vertical trace) portion of each field to the transition detector 30. The transition detector 30 will produce a train of pulses representing signal transitions, which pulses are counted by the counter 32. At the end of the active video interval the gate 20 is opened, and the count of the counter is read into the microprocessor. The counter 32 is then reset by the microprocessor in preparation for the next active video interval.

After a number of fields have been sampled, and their transitions counted, the microprocessor can examine the stored count total to determine the amount of detail information of the scene, as represented by the transitions. If the detail of the scene is relatively high, the microprocessor will change the peaking control voltage to depeak, or soften, the picture. If the detail of the scene is relatively low, the microprocessor will change the peaking control voltage to peak up the picture. The peaking control voltage produced by the microprocessor is held by a sample-and-hold arrangement in the multiplexer or the peaking circuitry of the television receiver, since the control voltage is multiplexed.

The detection of a large number of transitions in a scene may also be indicative of noise contamination of the video signal. Thus, depeaking is the proper response to a high transition count, since impulse noise is less obtrusive when the picture is softened.

In order to make a better determination of noise contamination, the microprocessor 40 may also close the gate 20 during a portion of the vertical blanking (vertical retrace) interval. If the picture is noise-free, no transitions should be detected between synchronizing pulses of the vertical blanking interval. The counter 32 will count transitions between these sync pulses. A low count is indicative of a relatively noise-free signal, which indicates that no depeaking is necessary to offset the effects of noise in the picture. But if the transition count is high during the vertical blanking interval, the video signal is most likely contaminated by impulse noise, and the proper response is a softening of the picture or the activation of impulse noise cancelling circuitry.

If the video signal is relatively noise-free, the arrangement of FIG. 6 will look for interfering beat signals in the video signal. These interfering beats are most easily identified as low amplitude oscillations of the signal between sync pulses in the vertical blanking interval. The microprocessor will lower the threshold value supplied to the transition detector to enable detection of these low amplitude oscillations. If a large number of low amplitude transitions are detected between the sync pulses, the microprocessor will alter the interference reduction voltage to retune an adjacent channel trap in the television tuner or I.F. circuitry. Such interfering beats can occur, for instance, when the tuner is tuned to receive a non-standard video signal from a CATV system, whereby adjacent channels will not be located at their expected frequencies for trapping. A typical trap to which the interference reduction voltage may be applied is shown in U.S. patent application Ser. No. 164,684, entitled MULTIPLEXING ARRANGEMENT FOR A PLURALITY OF VOLTAGE CONTROLLED FILTERS, filed June 30, 1980. With the trap thus retuned, the arrangement of FIG. 6 can resume sampling the signal during the vertical blanking interval to confirm that the retuning actually reduced the interfering beat frequency, and can again adjust the trap if necessary.

The arrangement of FIG. 6 can be modified by replacing counter 32 with the arrangement of FIG. 7. The new configuration can be used to identify the frequencies of signal components of the video signal. Referring concurrently to FIGS. 4, 6 and 7, the C4 (carry-out) output of adder 62 is coupled to an input of an AND gate P and an inverter 96. The output of inverter 96 is coupled to one input of an AND gate N. The output of comparator 80 is coupled to second inputs of AND gates P and N. The output of AND gate P is coupled to the "set" input S of an R-S type flip-flop 92, and the output of AND gate N is coupled to the "reset" input R of flip-flop 92. The Q output of flip-flop 92 is coupled to an input of an AND gate 98, and the $\overline{Q}$ output of flip-flop 92 is coupled to the microprocessor 40. A clock signal such as the 14.32 MHz clock signal is coupled to a second input of AND gate 98, the output of which is coupled to the "clock" input C of a counter 94. The counter 94 receives a reset signal from the microprocessor 40, and has output lines coupled to an input of the microprocessor.

Figure 8:
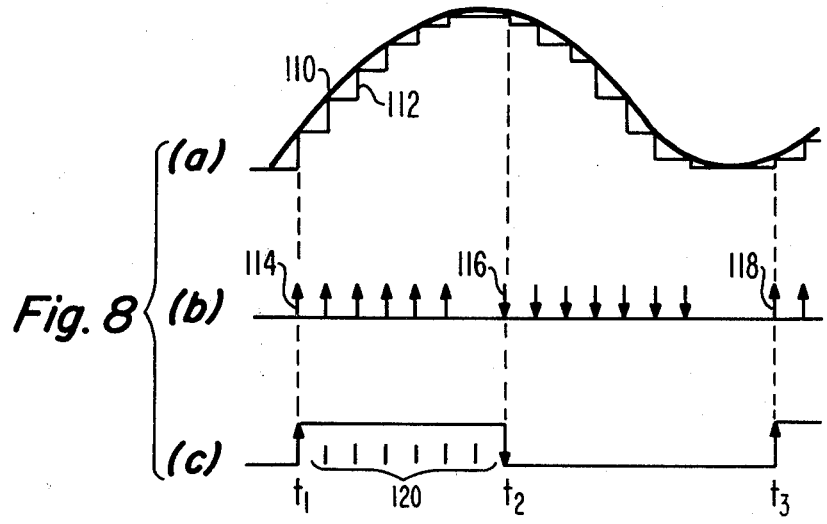

The operation of the arrangement of FIGS. 6 and 7 may be understood by referring concurrently to the waveforms of FIG. 8. An oscillatory waveform 110 is sampled by the analog-to-digital converter 12 at times indicated by the vertical steps of the step-like line 112 of FIG. 8(a). At each sampling point, the new sample is compared with the previous sample by the transition detector 30 to produce a sequence of transition-representative pulses, shown as arrows in FIG. 8(b). Upward-pointing arrows indicate positive transitions of waveform 110, and downward-pointing arrows indicate negative transitions of the waveforms.

Upon the occurrence of each positive transition pulse, such as pulse 114, the comparator 80 will produce an output pulse, and the carry-out signal of the C4 output of adder 62 will be at a logical "1" level. These two signals enable AND gate P, which thus produces a pulse for every pulse representing a positive transition. Therefore, at time $t_1$ when pulse 114 occurs, AND gate P will set flip-flop 92, which in turn enables AND gate 98 to apply clock pulses to counter 94. Counter 94 then counts a clock pulse at time $t_1$, as well as succeeding clock pulses, as shown at 120 in FIG. 8(c).

At time $t_2$, the first negative transition pulse 116 occurs. The signal at the C4 output of adder 62 goes to a logical "0" state, which disables AND gate P and produces a positive pulse at the output of inverter 96. Both inputs of AND gate N are now enabled, so that gate N produces an output pulse in response to negative transitions of the waveform. AND gate N resets flip-flop 92 at time $t_2$, which disables AND gate 98 and stops the sequence of clock pulses at the input of counter 94. The transition of the Q output of the flip-flop 92 to a high state at this time notifies the microprocessor that the counter 94 is ready to be sampled. The microprocessor then stores the count of the counter and resets it in preparation for the next counting sequence at time $t_3$.

The count of the counter is a measure of the number of clock cycles occurring during a quarter-cycle of an oscillatory waveform, such as waveform 110, or during a half cycle of a square wave. By knowing the frequency of the clock, the frequency of oscillatory waveforms can be readily ascertained by the microprocessor, since the two are directly related: the higher the number of clock cycles during a quarter cycle of the waveform 110, the lower the frequency of the waveform. Signal components of specific frequencies can thus be identified using the arrangements of FIGS. 6 and 7.

In certain circumstances, it may be desirable to identify signals of only a given frequency. For instance, interfering beat signals generated by an adjacent television channel are liable to have a frequency of approximately three MHz. Thus, it may be desirable to look for a three MHz interfering signal during the vertical blanking interval. This may be done by replacing the counter 32 of FIG. 6 with the arrangement of FIG. 9.

Referring concurrently to FIGS. 4, 6 and 9, an AND gate P and an inverter 104 have inputs coupled to the C4 output of adder 62. The output of the comparator 80 is coupled to a second input of AND gate P and to an input of an AND gate N. The output of inverter 104 is coupled to a second input of AND gate N. The output of AND gate P is coupled to the input of a monostable multivibrator 100, which has an output coupled to the input of a monostable multivibrator 102. An output of monostable multivibrator 102 is coupled to one input of an AND gate 106, and the output of AND gate N is coupled to a second input of AND gate 106. The output of AND gate 106 is coupled to the clock input C of a counter 108. Output lines of the counter 108 are coupled to an input of the microprocessor 40, and the counter 108 receives a reset signal from the microprocessor.

Figure 10:
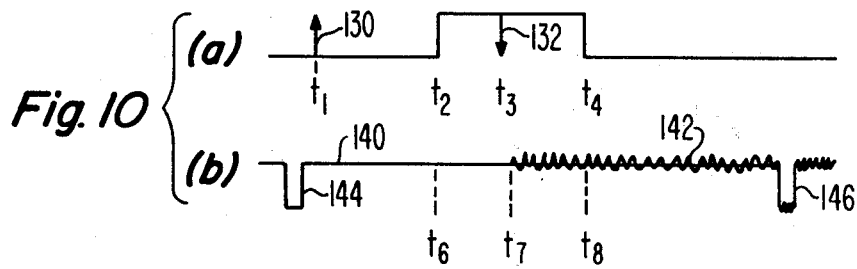

The operation of the arrangement of FIGS. 6 and 9 may be understood by referring to the waveforms of FIG. 10. FIG. 10(b) shows two sync pulses of the vertical blanking interval, 144 and 146, which are normally separated by an interval containing no signal information. If no noise or interference signals are present, the signal appears smooth, as represented by the line 140 between times $t_6$ and $t_7$. However, if an interfering beat signal is present, it will appear as a low level oscillation, as shown by the oscillatory line 142 between times $t_7$ and $t_8$.

The arrangement of FIGS. 6 and 9 identifies the interfering beat signal by sampling the video signal between sync pulses 144 and 146, during which time the gate 20 is clocked to apply the video signal to the digital transition detector 30. An appropriate threshold level is applied to the detector 30 so that a pulse train representing transitions of beat signal 142 is produced. When a positive transition pulse is produced, as represented by arrow 130 of FIG. 10(a) at time $t_1$, the pulse output of the transition detector and the logical "1" carry-out signal of adder 62 enables gate P, which in turn causes monostable multivibrator 100 to produce a pulse which lasts from time $t_1$ to time $t_2$. The termination of the pulse triggers monostable multivibrator 102 to produce a pulse lasting from time $t_2$ to time $t_4$.

The pulse produced by monostable multivibrator 102 renders AND gate 106 enabled at one input for a "window" of time defining the expected time location of a successive negative transition of a three MHz signal following the positive transition 130. If transition pulse 130 is a positive transition of a three MHz signal, a negative transition pulse will occur as shown by arrow 132 of FIG. 10a during the time window when AND gate 106 is enabled. The output pulse of the transition detector 30 and the logical "0" carry-out signal from adder 62 together enable AND gate N, which produces a pulse at time $t_3$ of FIG. 10a. This pulse is passed by AND gate 106 and increments the count of counter 108. Over the interval between pulses 144 and 146, numerous such transition pairs of a three MHz beat signal will be detected and will increment the counter 108. At the end of the sampling interval, the microprocessor will store the counter contents and reset the counter in preparation for the next sampling interval. Over one or more sampling intervals, the microprocessor will accumulate enough samples representative of a three MHz signal to ascertain that a beat signal is present. The microprocessor can respond to this determination by adjusting the interference reduction voltage to attenuate the beat-causing signal.

It is to be understood that the delayed window of the arrangement of FIG. 9 can also be generated by using counters instead of monostable multivibrators to generate the window in a clocked manner.

The digital transition detector of the present invention also has application in a television ghost signal detector system, such as that described in my concurrently filed U.S. patent application Ser. No. 76,841, entitled TELEVISION GHOST SIGNAL DETECTION DURING THE VIDEO INFORMATION INTERVAL.

What is claimed is:

1. In a signal processing system, including means for producing a video signal, apparatus for analyzing the signal transition characteristic of said video signal comprising:

means, responsive to said video signal, for producing a sequence of transition-representative signals referenced to a predetermined level;

means, responsive to said sequence to transition-representative signals, for passing transition-representative signals of a given polarity or polarities with respect to said predetermined level;

means, responsive to signals passed by said signal passing means, for producing a sequence of position-modulated pulse only when said transition-representative signals passed by said signal passing means exceed said predetermined level by a given amount; and means, responsive to said sequence of position-modulated pulses, for evaluating the time relationships between ones of said pulses over a given time interval to produce a control signal for controlling a predetermined characteristic of said signal processing system.

2. In a signal processing system, including means for producing a video signal, apparatus for analyzing the signal transition characteristic of said video signal comprising:
   a transversal filter, having an input coupled to receive an input video signal, and having an output at which components of said input video signal occupying a given band of frequencies are produced;
   a polarity selection circuit, having an input coupled to the output of said transversal filter, and an output, for passing transition information of said given band of frequencies which exhibit a given polarity; and
   a comparator, having an input coupled to the output of said polarity selection circuit, and an output at which a sequence of position-modulated pulses is produced which is representative of the times of occurrence of transitions of said input video signal of said band of frequencies which exceed a given threshold level.

3. The arrangement of claim 2, wherein said transversal filter is an adaptive transversal filter for varying said given band of frequencies, and wherein said position-modulated pulses exhibit substantially constant pulse widths.

4. Apparatus for analyzing the signal transition characteristic of a digitized video signal comprising:
   a source of digital video signal samples;
   delay means, having an input responsive to said digital video signal samples and an output for producing delayed digital video signal samples;
   an adder having a first input responsive to said digital video signal samples and a second input coupled to receive said delayed digital video signal samples, and an output at which digital sum words of said applied digital video signal samples are produced; and
   a comparator, having a first input coupled to receive said digital sum words, and a second input coupled to receive a digital threshold value, and an output at which pulses are produced when ones of said digital sum words exceed said digital threshold value.

5. The arrangement of claim 4, wherein said delay means includes a shift register.

6. The arrangement of claim 4, wherein said delay means includes a tapped shift register having an input coupled to receive said digital video signal samples, and means for coupling one of said taps of said tapped shift register to said second input of said adder.

7. The arrangement of claim 6, wherein said adder includes a plurality of sum signal outputs and a carry-out signal output; and further comprising:
   means, responsive to said sum signals and said carry-out signal, for passing sum signals normalized to a given polarity.

8. In a signal processing system including means for producing a video signal, apparatus for analyzing the signal transition characteristic of said video signal comprising:
   means, responsive to said video signal, for producing a sequence of position-modulated pulses corresponding to transitions of said input signal which exceed a given threshold level; and
   means, responsive to said sequence of position-modulated pulses, for evaluating the time relationships between ones of said pulses over a given time interval to produce a control signal for controlling a predetermined characteristic of said signal processing system.

9. The arrangement of claim 8, wherein said time relationship evaluating means comprises a counter for counting said position-modulated pulses.

10. The arrangement of claim 9, further including means for controlling said counter to count the number of said position-modulated pulses occurring during a video field.

11. The arrangement of claim 9, further comprising means responsive to the count of said counter for generating a control signal for controlling the peaking of said video signal as a function of the count of said counter.

12. The arrangement of claim 8, wherein said position-modulated pulse producing means includes means for producing polarity signals indicative of the polarity of said transitions of said input signal, and wherein said time relationship evaluating means comprises:
   means, responsive to said position-modulated pulses and said polarity signals for determining the time duration between ones of said position-modulated pulses representing transitions of respective opposite polarity.

13. The arrangement of claim 12, further including a source of clock signals, and wherein said time-duration determining means comprises:
   means for determining the number of cycles of said clock signals between ones of said position-modulated pulses representing transitions of respective opposite polarity.

14. The arrangement of claim 13, wherein said clock cycle determining means comprises a counter which counts clock cycles between said ones of said position-modulated pulses.

15. The arrangement of claim 12, wherein said time-duration determining means comprises means for recording the number of said position-modulated pulses representing transitions of a first polarity which follow in time position-modulated pulses representing transitions of a second polarity by a given time interval.

16. The arrangement of claim 15, wherein said recording means comprises a counter.

17. The arrangement of claims 12 or 15 further comprising means responsive to said determined time durations for generating an interference reduction control signal.

* * * * *